US008550688B2

(12) United States Patent
Seo et al.

(10) Patent No.: US 8,550,688 B2
(45) Date of Patent: Oct. 8, 2013

(54) BACKLIGHT ASSEMBLY WITH OPTICAL MEMBER COUPLING MEANS AND DISPLAY APPARTUS HAVING THE SAME

(75) Inventors: Jeong-Min Seo, Yongin-si (KR); Youngho Lee, Suwon-si (KR); Jaehwan Chun, Suwon-si (KR); Sungwon Chung, Asan-si (KR); Tae-Sung Kim, Bucheon-si (KR)

(73) Assignee: Samsung Display Co., Ltd, Yongin, Gyeonggi-Do (KR)

( * ) Notice: Subject to any disclaimer, the term of this patent is extended or adjusted under 35 U.S.C. 154(b) by 107 days.

(21) Appl. No.: 13/016,289

(22) Filed: Jan. 28, 2011

(65) Prior Publication Data
US 2011/0205728 A1 Aug. 25, 2011

(30) Foreign Application Priority Data

Feb. 24, 2010 (KR) .......................... 10-2010-0016726

(51) Int. Cl.
*F21V 7/10* (2006.01)

(52) U.S. Cl.
USPC .......... 362/633; 362/632; 362/634; 362/97.1; 362/217.11; 349/58

(58) Field of Classification Search
USPC .................. 362/606, 607, 618, 627, 632, 633, 362/634, 97.1, 97.2, 97.3, 217.01, 225, 217.1, 362/217.11, 217.15; 349/58, 64; 403/263, 403/361
See application file for complete search history.

(56) References Cited

U.S. PATENT DOCUMENTS

| | | | | |
|---|---|---|---|---|
| 6,175,396 B1 * | 1/2001 | Kim et al. | ........................ | 349/58 |
| 6,835,961 B2 * | 12/2004 | Fukayama | ...................... | 349/59 |
| 6,867,824 B2 * | 3/2005 | Eiraku et al. | .................... | 349/58 |
| 6,950,154 B2 * | 9/2005 | Lee | ................................. | 349/58 |
| 7,125,157 B2 * | 10/2006 | Fu et al. | ......................... | 362/632 |
| 7,184,110 B2 * | 2/2007 | Kim et al. | ........................ | 349/58 |
| 7,224,416 B2 * | 5/2007 | Cha et al. | ......................... | 349/60 |
| 7,324,174 B2 * | 1/2008 | Hafuka et al. | .................. | 349/58 |
| 7,380,972 B2 * | 6/2008 | Shimizu | ......................... | 362/632 |
| 7,443,460 B2 * | 10/2008 | Park | ............................. | 349/58 |
| 7,481,569 B2 * | 1/2009 | Chang | ............................ | 362/633 |
| 7,543,975 B2 * | 6/2009 | Yuan et al. | ..................... | 362/632 |
| 7,780,333 B2 * | 8/2010 | Hsu et al. | ........................ | 362/633 |
| 7,973,872 B2 * | 7/2011 | Kim et al. | ........................ | 349/58 |
| 8,085,362 B2 * | 12/2011 | Harada | ........................... | 349/70 |
| 2002/0041492 A1 * | 4/2002 | Ichikawa | ......................... | 362/31 |
| 2004/0109308 A1 * | 6/2004 | Ho | ................................. | 362/97 |
| 2010/0027241 A1 * | 2/2010 | Nakanishi | .................... | 362/97.1 |

* cited by examiner

*Primary Examiner* — Ismael Negron
(74) *Attorney, Agent, or Firm* — F. Chau & Associates, LLC

(57) ABSTRACT

A backlight assembly includes a light generating unit, a receiving member, an optical member, and a frame member. The receiving member includes a receiving part receiving the light generating unit, a supporting part extending from the receiving part, and a protrusion portion protruded from the supporting part. The optical member is guided to a predetermined position on the supporting part by the protrusion portion, and diffuses the light provided from the light generating unit. The frame member includes a fixing part coupled with the supporting part and protruded from a surface of the frame member facing the supporting part. The fixing part prevents the optical member from moving in a direction substantially parallel to an upper surface of the supporting part.

18 Claims, 9 Drawing Sheets

BACKLIGHT ASSEMBLY WITH OPTICAL MEMBER COUPLING MEANS AND DISPLAY APPARTUS HAVING THE SAME

CROSS-REFERENCE TO RELATED APPLICATION

This application relies for priority upon Korean Patent Application No. 2010-16726 filed on Feb. 24, 2010, the contents of which are herein incorporated by reference in its entirety.

BACKGROUND

1. Technical Field

The present invention relates to a backlight assembly and a display apparatus, more particularly, to a backlight assembly capable of preventing movement of a diffusion plate thereof and a display apparatus having the backlight assembly.

2. Discussion of the Related Art

In general, a liquid crystal display includes a liquid crystal display panel displaying an image and a backlight assembly providing light to the liquid crystal display panel.

The backlight assembly may be classified as an edge-illumination type backlight assembly and a direct-illumination type backlight assembly based on the position of a lamp that generates the light. The edge-illumination type backlight assembly includes a lamp disposed adjacent to a side surface of a light guide plate, and the direct-illumination type backlight assembly includes a plurality of lamps disposed under a diffusion plate.

In the direct-illumination type backlight assembly, the lamps are received in a receiving container and disposed under the liquid crystal display panel. The diffusion plate is disposed on the lamps to improve brightness of the light. However, since the diffusion plate is disposed on the receiving container, the lamps can be damaged due to the movement of the diffusion plate when external impacts are applied to the diffusion plate. In addition, the light may leak through a space generated by the movement of the diffusion plate.

SUMMARY

Exemplary embodiments of the present invention provide a backlight assembly capable of preventing movement of a diffusion plate thereof to reduce and/or prevent light leakage and facilitate assembly.

Exemplary embodiments of the present invention also provide a display apparatus having the backlight assembly.

According to exemplary embodiments, a backlight assembly includes a light generating unit that generates a light, a receiving member, an optical member, and a frame member. The receiving member includes a receiving part receiving the light generating unit, a supporting part extending from the receiving part, and a protrusion portion protruded from the supporting part. The optical member is located at a predetermined position on the supporting part and includes a portion coupled to the protrusion portion. The optical member diffuses the light provided from the light generating unit. The frame member includes a fixing part coupled with the supporting part and protruded from a surface of the frame member facing the supporting part. The fixing part prevents the optical member from moving in a direction substantially parallel to an upper surface of the supporting part.

According to exemplary embodiments, a display apparatus includes a backlight assembly that generates a light and a display panel that receives the light to display an image.

The backlight assembly includes a light generating unit that generates a light, a receiving member, an optical member, and a frame member. The receiving member includes a receiving part receiving the light generating unit, a supporting part extending from the receiving part, and a protrusion portion protruded from the supporting part. The optical member is guided to a predetermined position on the supporting part by the protrusion portion, and diffuses the light provided from the light generating unit. The frame member includes a fixing part coupled with the supporting part and protruded from a surface facing the supporting part to prevent the optical member from moving in a direction substantially parallel to an upper surface of the supporting part.

According to the embodiments, since the frame member includes the fixing part facing a side surface of the diffusion plate, the diffusion plate may be prevented from moving due to external impacts. Thus, the construction of the backlight assembly and the display apparatus may prevent the occurrence of assembling defects and light leakage due to movement of the optical member.

BRIEF DESCRIPTION OF THE DRAWINGS

The exemplary embodiments of the present invention will become readily apparent by reference to the following detailed description when considered in conjunction with the accompanying drawings wherein.

DESCRIPTION OF THE EMBODIMENTS

It will be understood that when an element or layer is referred to as being "on", "connected to" or "coupled to" another element or layer, it can be directly on, connected or coupled to the other element or layer or intervening elements or layers may be present. Like numbers may refer to like elements throughout. As used herein, the term "and/or" includes any and all combinations of one or more of the associated listed items.

Hereinafter, the embodiments of the present invention will be explained in further detail with reference to the accompanying drawings.

Figure 1:
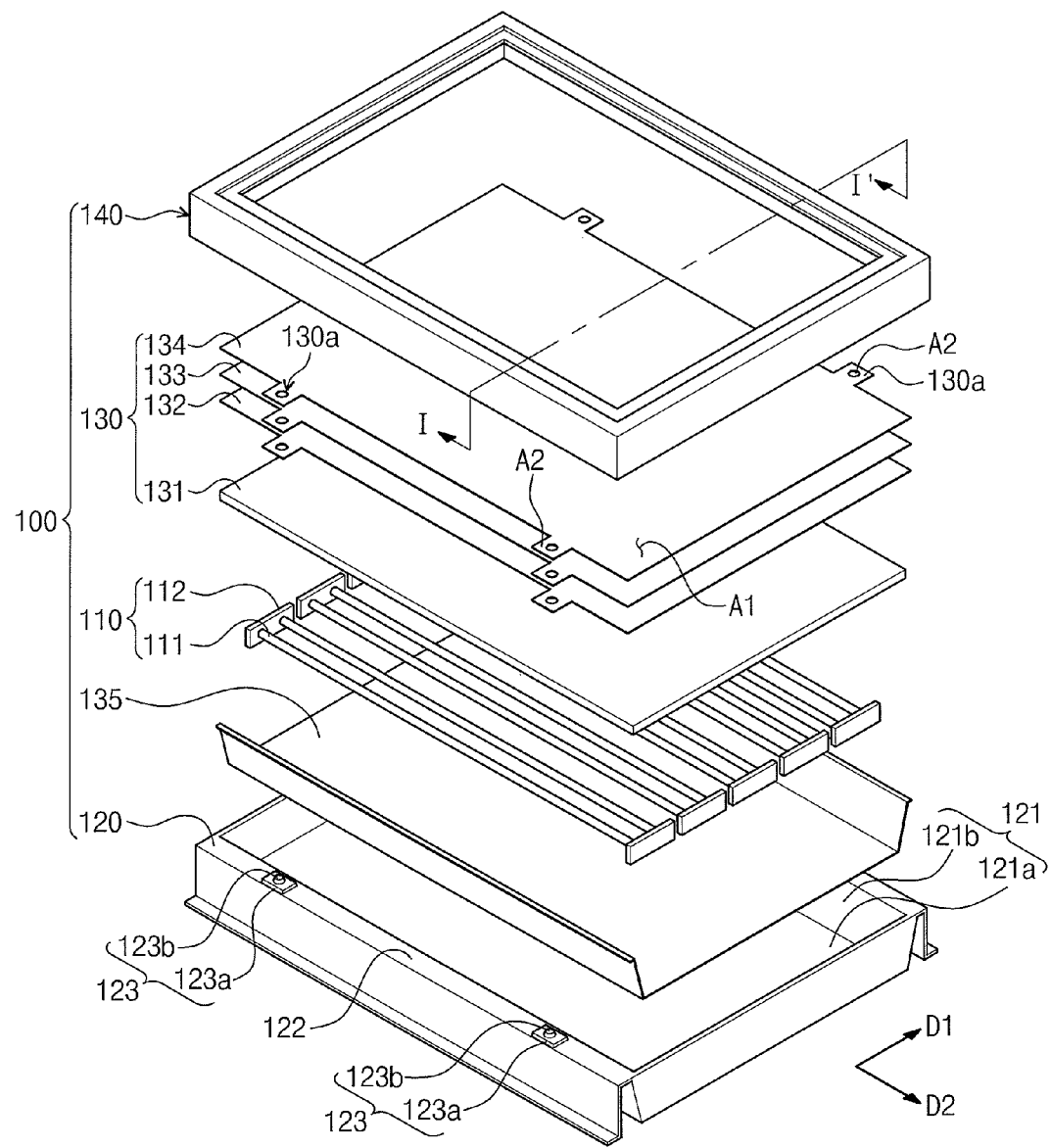
FIG. 1 is an exploded perspective view showing a backlight assembly according to an exemplary embodiment of the present invention.
Figure 2:
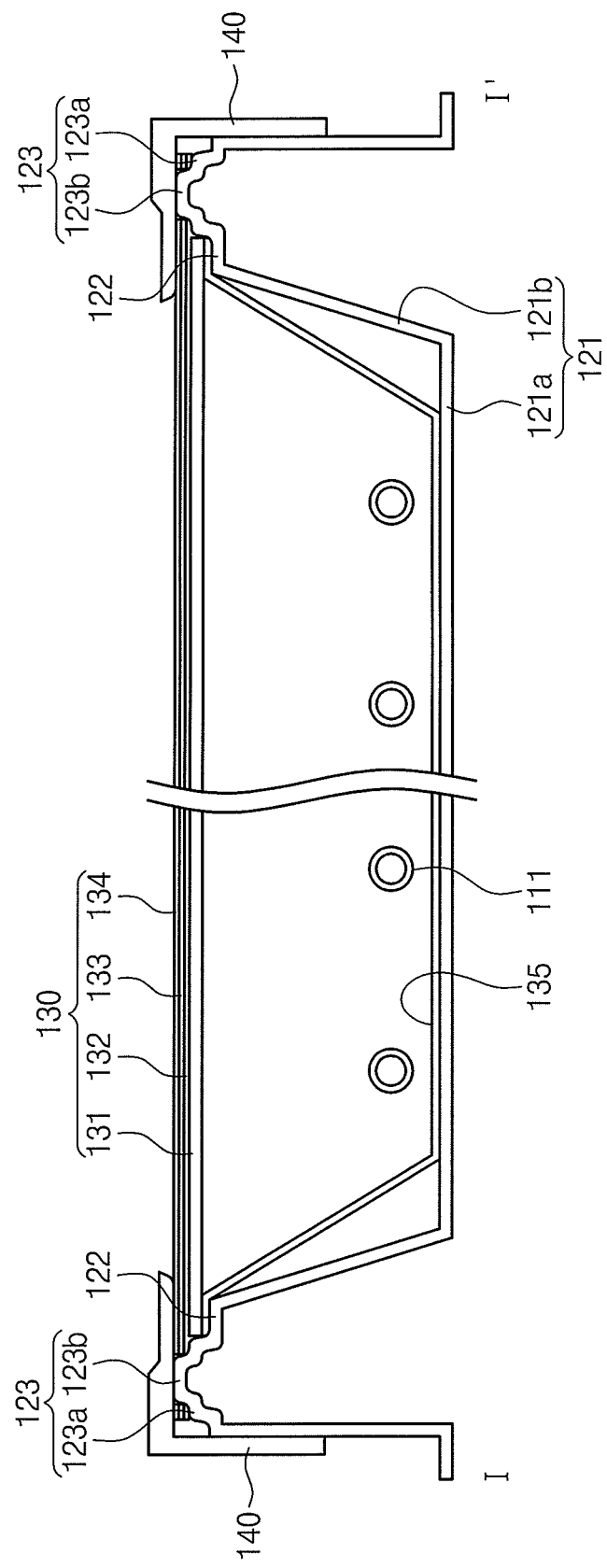
FIG. 2 is a cross-sectional view taken along a line I-I' of FIG. 1.

FIG. 1 is an exploded perspective view showing a backlight assembly according to an exemplary embodiment of the present invention, and FIG. 2 is a cross-sectional view taken along a line I-I' of FIG. 1.

Referring to FIGS. 1 and 2, a backlight assembly 100 includes a light generating unit 110, a receiving member 120, an optical member 130, and a frame member 140.

The light generating unit 110 includes a plurality of lamps 111 each generating light and a plurality of lamp holders 112. The lamps 111 generate the light in response to a driving voltage and each lamp may be a cold cathode fluorescent lamp having a cylindrical bar shape. The lamps 111 may be arranged at regular intervals in order to improve brightness uniformity of the backlight assembly 100. In According to an embodiment, the lamps 111 each may be an external electrode fluorescent lamp provided with external electrodes at both ends thereof.

The lamp holders 112 are arranged at both ends of the lamp 111 to hold the both ends of the lamps 111 to prevent the movement of the lamps 111. According to an embodiment, each of the lamp holders 112 may be coupled with two lamps 111 adjacent to each other.

The receiving member 120 includes a receiving part 121 receiving the light generating unit 110 therein and a supporting part 122 supporting the optical member 130. The receiving part 121 includes a bottom surface 121a and a sidewall 121b extended from the bottom surface 121a, and the bottom surface 121a has a rectangular-like shape. The sidewall 121b extends from edges of the bottom surface 121a to provide a receiving space in which the light generating unit 100 is received. The receiving member 120 may be formed of a metal material, for example, an aluminum-based metal having requisite strength and deforming resistance, in order to effectively discharge heat generated in the light generating unit 100. For example, the aluminum-based metal may have a relatively high strength and low deforming resistance.

Although not shown in FIGS. 1 and 2, the backlight assembly 100 may further include a side mold (not shown) disposed at the sidewall 121b of the receiving member 120 adjacent to the both ends of the lamps 111 to hold the both ends of the lamps 111. According to an embodiment, the side mold covers the lamp holders 112, thereby preventing non-uniformity of brightness of the backlight assembly 100.

In addition, the backlight assembly 100 further includes a reflection sheet 135 disposed under the light generating unit 110. The reflection sheet 135 reflects the light leaked from the light generating unit 110 to the optical member 130 to improve a light using efficiency. As an example, the reflection sheet 135 may include polyethylene terephthalate (PET) or polycarbonate (PC).

The supporting part 122 of the receiving member 120 includes an upper surface on which the optical member 130 is mounted and a protrusion portion 123 protruded from the upper surface of the supporting part 122 to guide the optical member 130 to a predetermined position on the supporting part 122.

The optical member 130 is guided by the protrusion portion 123 to the predetermined position on the supporting part 122. Once in position, the optical member 130 may receive the light from the light generating unit 110 and diffuse the light. According to an exemplary embodiment, the optical member 130 includes a diffusion plate 131 and optical sheets 132, 133, and 134 disposed on the diffusion plate 131.

According to an embodiment, the protrusion portion 123 has a two-tiered protruding structure. In particular, the protrusion portion 123 includes a guide portion 123a protruded from the supporting part 122 to guide the diffusion plate 131 and a coupling protrusion 123b coupled with the optical sheets 132, 133, and 134.

The diffusion plate 131 has a plate-like shape and is guided by the guide portion 123a to the predetermined position of the supporting part 122. Accordingly, the diffusion plate 131 is disposed on the light generating unit 110 and diffuses the light from the light generating unit 110 to improve the brightness uniformity. In addition, the diffusion plate 131 may support the optical sheets 132, 133, and 134 such that the optical sheets 132, 133, and 134 do not sag.

The optical sheets 132, 133, and 134 are disposed on the diffusion plate 131 and improve the brightness characteristics of the light exiting from the diffusion plate 131. For instance, the optical sheets 132, 133, and 134 may include a diffusion sheet 132 to diffuse the light and two light collection sheets 133 and 134 to collect the light.

The diffusion sheet 132 is disposed on the diffusion plate 131 and diffuses the light from the diffusion plate 131. The diffusion sheet 132 may be formed of a transparent material such as polyethylene terephthalate.

The light collection sheets 133 and 134 are disposed on the diffusion sheet 132 and collect the light diffused by the diffusion sheet 132 to improve a front brightness. Each of the light collection sheets 133 and 134 may include a fine prism pattern (not shown). Specifically, the prism pattern of one of the light collection sheets 133 and 134 extends in a first direction D1 and the prism pattern of the remaining one of the light collection sheets 133 and 134 extends in a second direction D2 substantially perpendicular to the first direction D1.

Each of the diffusion sheet 132 and the light collection sheets 133 and 134 may include a light transmitting portion A1 and a sheet fixing portion A2. The light transmitting portion A1 is positioned over the lamps 110 and the light emitted from the lamps 110 is transmitted through the light transmitting portion A1. The sheet fixing portion(s) A2 is formed by extending an end of the light transmitting portion A1 so that the sheet fixing portion A2 protrudes from the light transmitting portion A1. For instance, the sheet fixing portion A2 is provided in two locations on each of two ends of the light transmitting portion A1, and thus four protrusion portions 123 (two on each side) may be provided on the supporting part 122 of the receiving member 120.

Figure 3:
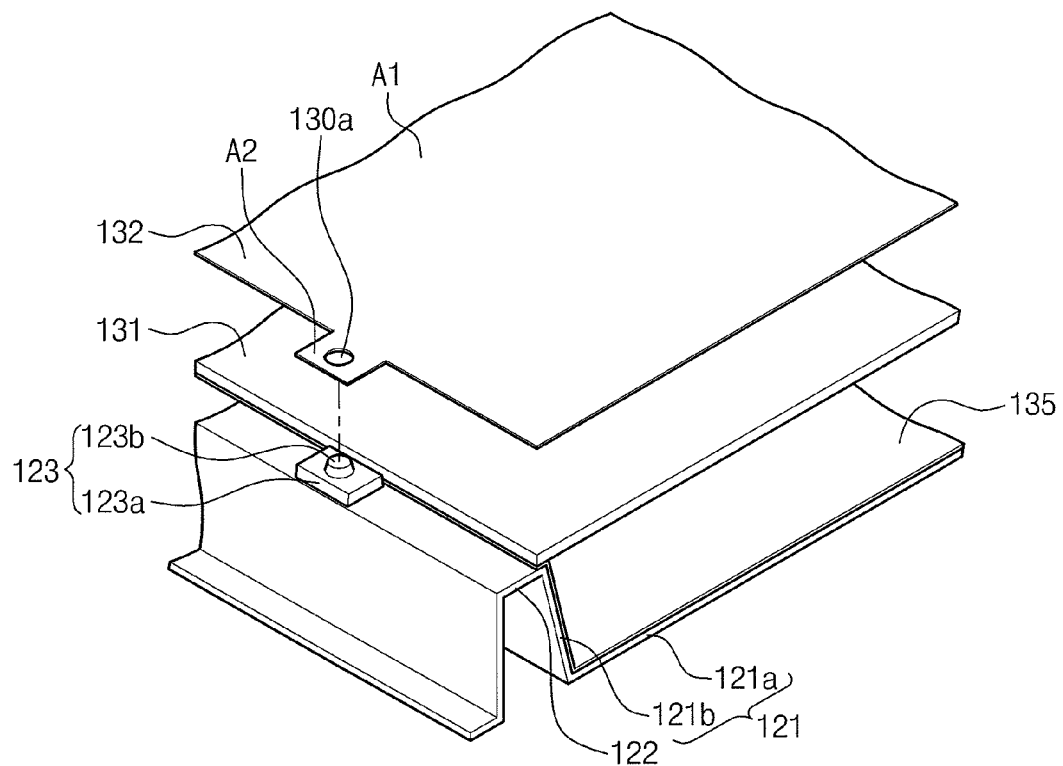
FIG. 3 is an exploded perspective view showing portions of a receiving container, a diffusion plate, and an optical sheet of FIG. 1.
Figure 4:
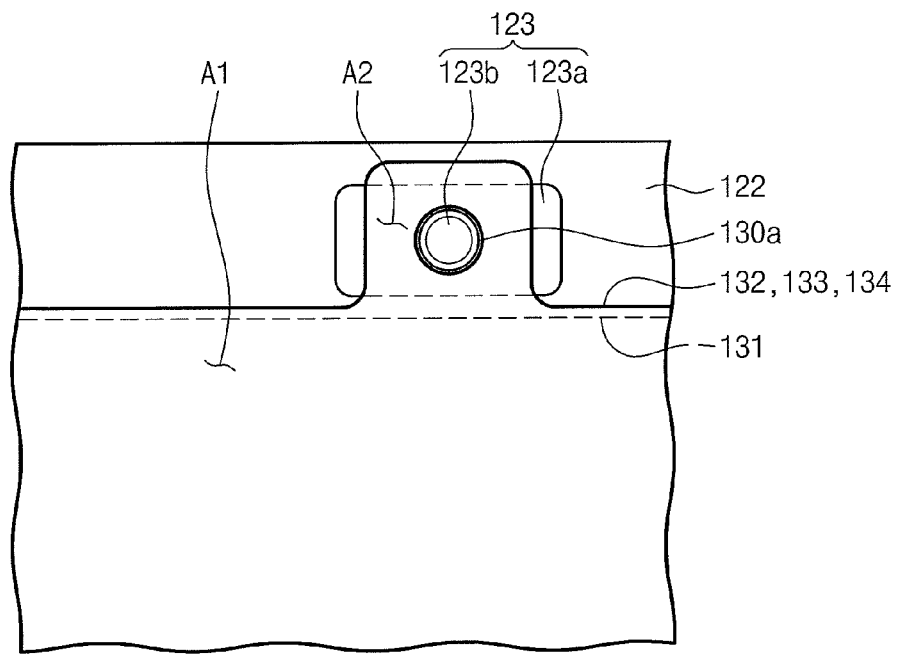
FIG. 4 is a plan view showing portions of the receiving container, the diffusion plate, and the optical sheet of FIG. 3.

FIG. 3 is an exploded perspective view showing portions of a receiving container, a diffusion plate, and an optical sheet of FIG. 1 and FIG. 4 is a plan view showing portions of the receiving container, the diffusion plate, and the optical sheet of FIG. 3.

Referring to FIGS. 3 and 4, the sheet fixing portion A2 is provided with a fixing hole 130a formed therethrough in order to fix the optical sheets 132, 133, and 134 to the coupling protrusion 123b of the receiving member 120.

The coupling protrusion 123b formed on the protrusion portion 123 of the receiving member 120 is inserted into the fixing hole 130a to fix the optical sheets 132, 133, and 134 to the receiving member 120.

According to an embodiment, the coupling protrusion 123b of the protrusion portion 123 has a circular column shape and is integrally formed with the guide portion 123a. In addition, the coupling protrusion 123b includes an upper portion having a round shape. According to an embodiment, the coupling protrusion 123b may have a convex semi-circular shape of which an outer diameter decreases closer to the upper end of the coupling protrusion 123b.

In addition, the coupling hole 130a may have a diameter equal to or smaller than a diameter of the coupling protrusion 123b to prevent the sheet fixing portion A2 from being separated from the coupling protrusion 123b. The optical sheets 132, 133, and 134 have elasticity, so that the coupling protrusion 123b may be inserted into the fixing hole 130a having the diameter equal to or smaller than a diameter of the coupling protrusion 123b formed through the sheet fixing portion A2. Accordingly, the sheet fixing portion A2 may prevent the deviation of the light transmitting portion A1 from its original position.

The frame member 140 of the backlight assembly 100 is coupled with the supporting part 122 of the receiving member 120 in a position facing the supporting part 122 of the receiving member 120.

Figure 5:
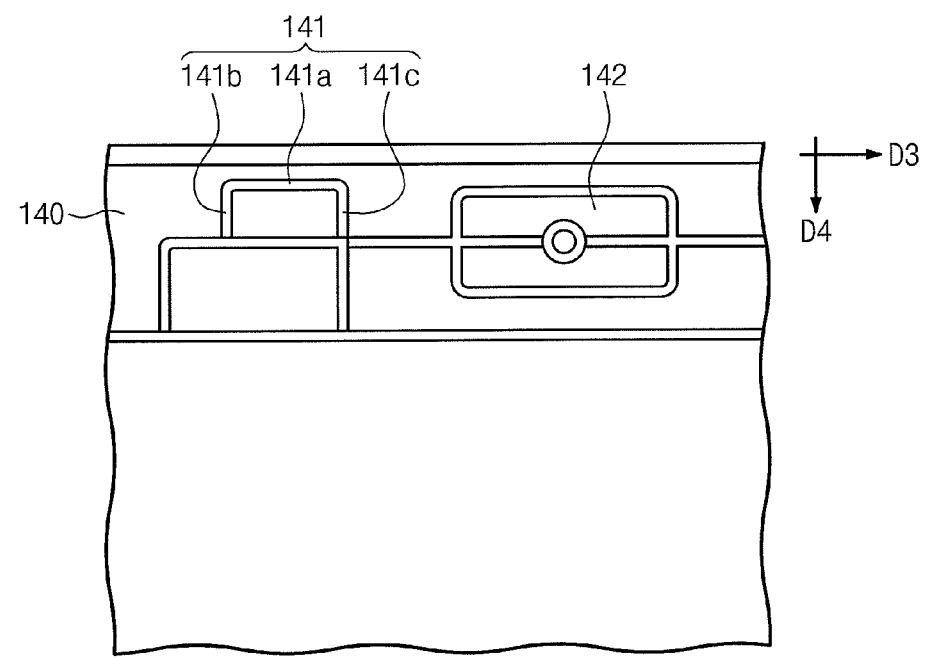
FIG. 5 is a rear plan view showing a portion of a frame member of FIG. 1.
Figure 6:
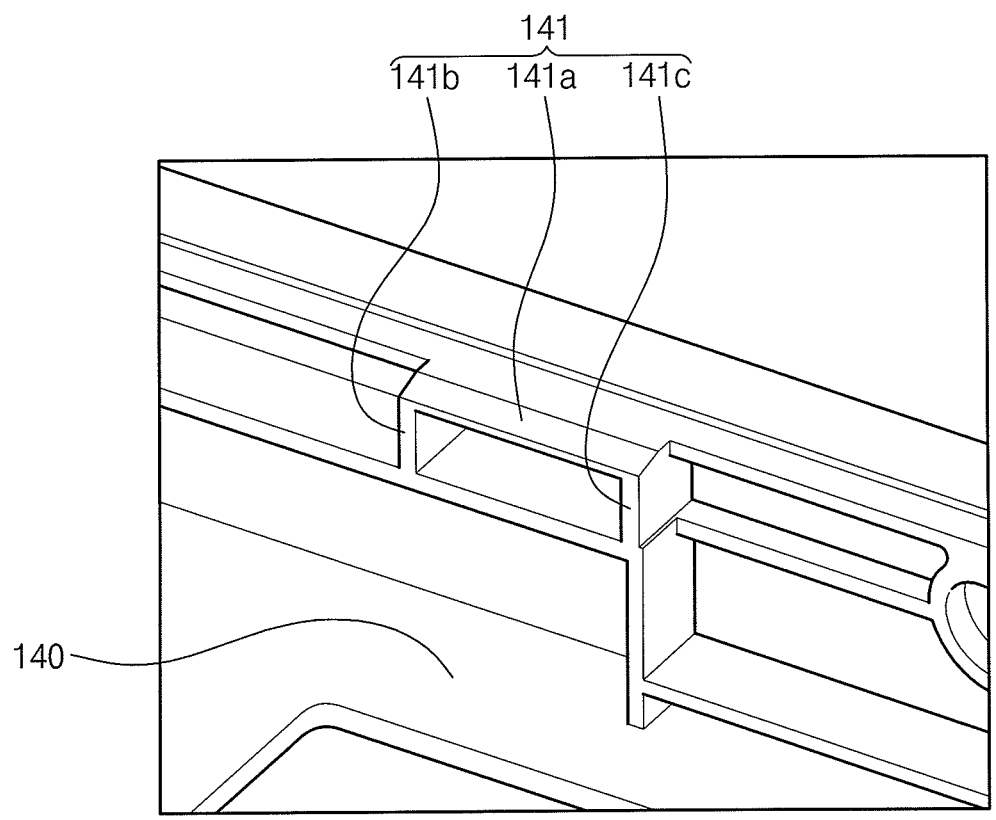
FIG. 6 is a perspective view showing a rear side of the frame member of FIG. 5.

FIG. 5 is a rear plan view showing a portion of a frame member of FIG. 1, and FIG. 6 is a perspective view showing a rear side of the frame member of FIG. 5.

Referring to FIGS. 5 and 6, the frame member 140 includes a fixing part 141 protruded from a surface opposite to the supporting part 122 and facing a surface of the diffusion plate 131.

The fixing part 141 includes a first barrier wall 141a extended in a third direction D3, a second barrier wall 141b extended in a fourth direction D4 substantially perpendicular to the third direction D3, and a third barrier wall 141 c extended in the fourth direction D4. As an example, the first barrier wall 141 a faces the surface of the diffusion plate 131 and prevents the diffusion plate 131 from moving toward a direction (e.g., the second direction D2) substantially parallel to a length of the upper surface of the supporting part 122. The second and third barrier walls 141b and 141c are respectively connected with both ends of the first barrier wall 141a to support the first barrier wall 141a.

In addition, the frame member 140 includes a receiving recess 142 formed on the surface opposite to the supporting part 122 to receive the protrusion portion 123. According to an exemplary embodiment, the fixing part 141 is spaced apart from the receiving recess 142 by a predetermined distance.

Figure 7:
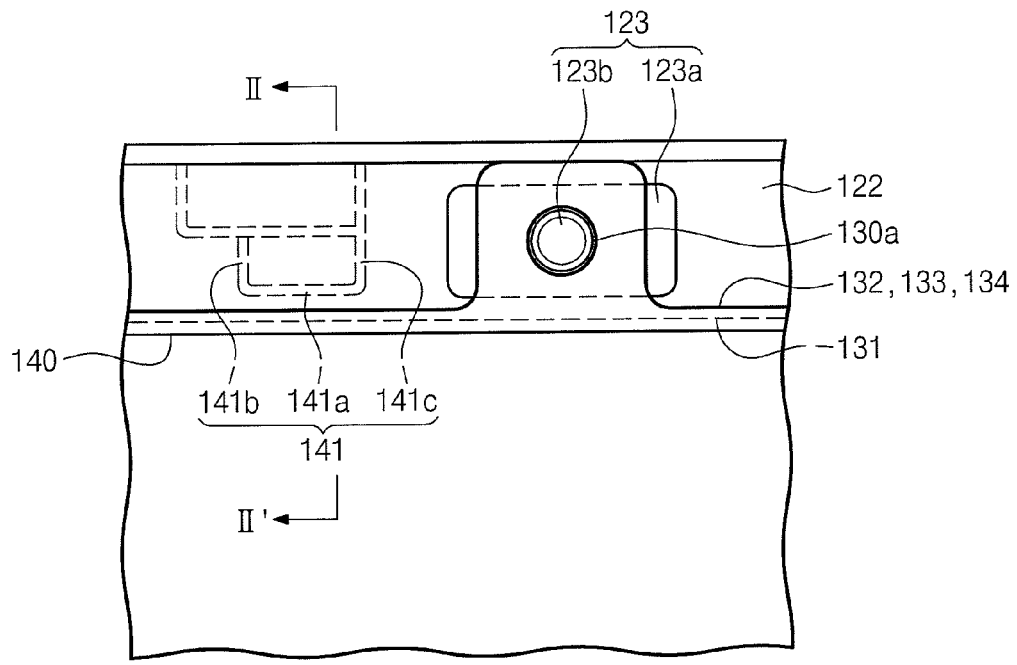
FIG. 7 is a plan view showing the frame member combined with the portions of the receiving member, the diffusion plate, and the optical sheet of FIG. 4.
Figure 8:
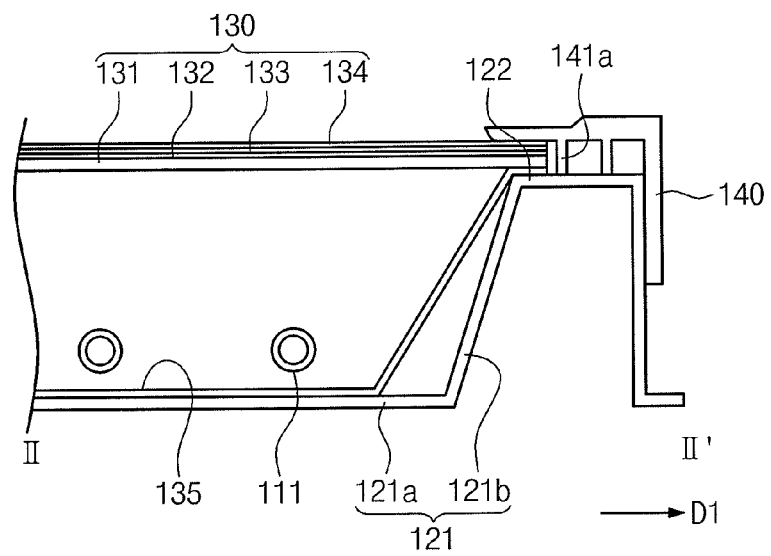
FIG. 8 is a cross-sectional view taken along a line II-II' of FIG. 7.

FIG. 7 is a plan view showing the frame member combined with the portions of the receiving member, the diffusion plate, and the optical sheet of FIG. 4, and FIG. 8 is a cross-sectional view taken along a line II-II' of FIG. 7.

Referring to FIGS. 7 and 8, when the frame member 140 is coupled with the supporting part 122 of the receiving member 120, the fixing part 141 may be positioned at a position close to the protrusion portion 123.

In addition, the first barrier wall 141a and the side surface of the guide portion 123a neighboring the diffusion plate 131 are positioned on the same straight line as each other. Referring to FIG. 8, the first barrier wall 141a protrudes from the opposite surface of the frame member 140 in a direction perpendicular to the upper surface of the diffusion plate to face a side surface of the diffusion plate 131. Thus, the first barrier wall 141a may prevent the diffusion plate 131 from moving in the second direction D2, thereby preventing the upward movement of an end portion of the diffusion plate 131 above the guide portion 123a even if external impacts are applied to the diffusion plate 131.

Specifically, the guide portion 123a has a height substantially equal to a thickness of the diffusion plate 131. If the height of the guide portion 123a were greater than the thickness of the diffusion plate 131, a distance space would be generated between the diffusion plate 131 and the optical sheets 132, 133, and 134 due to the sheet fixing portion A2, thereby causing deterioration in brightness. On the contrary, if the height of the guide portion 123a were smaller than the thickness of the diffusion plate 131, the adhesive force between the sheet fixing portion A2 and the coupling protrusion 123b would be deteriorated. Accordingly, according to an embodiment, the height of the guide portion 123a is substantially equal to a thickness of the diffusion plate 131.

When the first barrier wall 141a is formed on the frame member 140 to face the side surface of the diffusion plate 131, the end portion of the diffusion plate 131 may be prevented from upwardly moving above the guide portion 123a due to external impacts. Thus, although the height of the guide portion 123a is not increased, the diffusion plate 131 may still be prevented from moving due to external impacts.

In addition, if the diffusion plate 131 moves in the first direction D1 due to external impacts, excessive force may be applied to the first barrier wall 141a. Therefore, the fixing part 141 may further include the second and third barrier walls 141b and 141c to disperse the force applied to the first barrier wall 141a.

Figure 9:
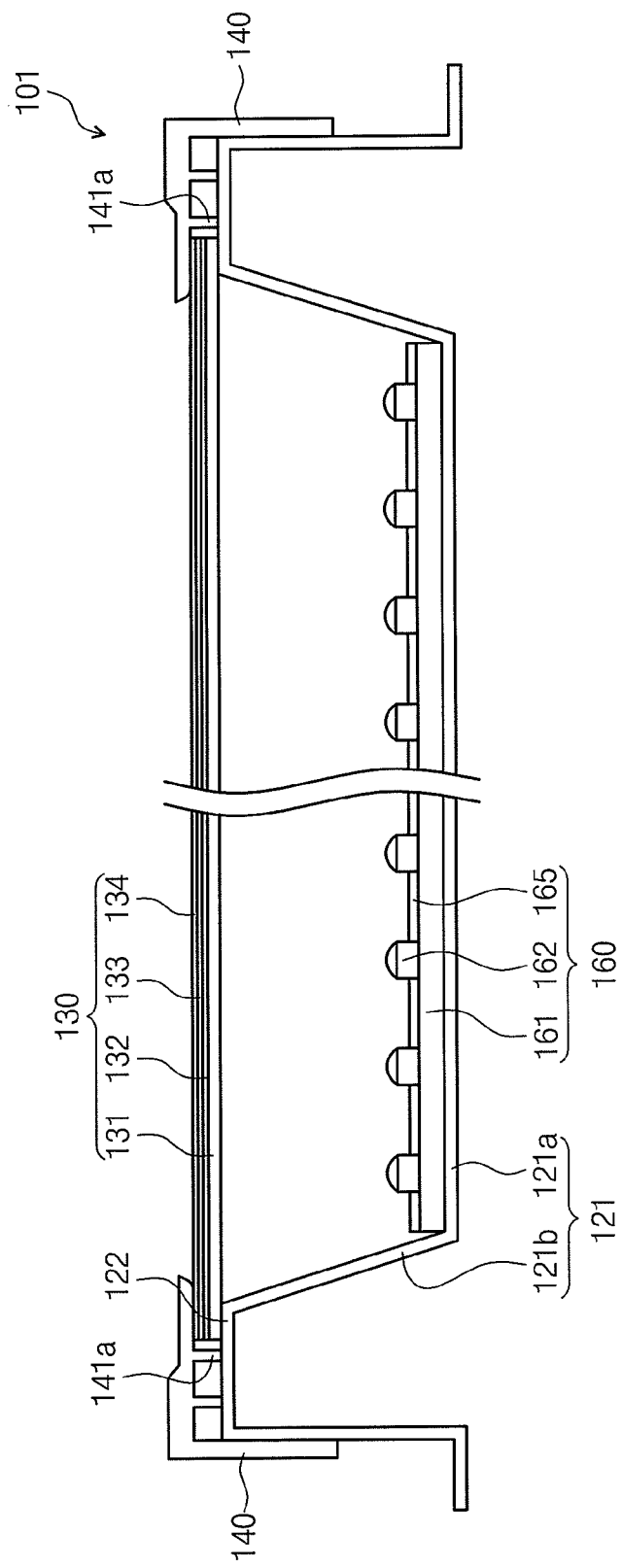
FIG. 9 is a cross-sectional view showing a backlight assembly according to an exemplary embodiment of the present invention.

FIG. 9 is a cross-sectional view showing a backlight assembly according to an exemplary embodiment of the present invention. In FIG. 9, the same reference numerals denote the same or similar elements in FIG. 2, and thus detailed descriptions of these elements will be omitted.

Referring to FIG. 9, a backlight assembly 101 includes a light generating unit 160, a receiving member 120, an optical member 130, and a frame member 140.

The light generating unit 160 includes a circuit board 161 and a plurality of light sources 162 mounted on the circuit board 161. The circuit board 161 is received in a receiving part 121 of the receiving member 120 to face the optical member 130. The light sources 162 may be arranged on the circuit board 161 in a matrix configuration.

The light sources 162 arranged on the circuit board 161 provide the light to the optical member 130. According to an embodiment, each of the light sources 162 may include a white light emitting diode that emits white light. According to another embodiment, the light sources 162 may include a red light emitting diode emitting red light, a green light emitting diode emitting green light, and a blue light emitting diode emitting blue light, and the red, green, and blue light emitting diodes may be turned on in sequence.

In addition, the light generating unit 160 may further include a reflection sheet 165 disposed on an upper surface of the circuit board 161 (i.e., the surface on which the light sources 162 are mounted). The reflection sheet 165 may include openings formed therethrough corresponding to the light sources 162. The reflection sheet 165 reflects the light emitted from the light sources 162 to the optical member 130 to improve light efficiency.

As shown in FIG. 9, when the frame member 140 is coupled with the supporting part 122 of the receiving member 120 to face the receiving member 120, the first barrier wall 141a is positioned to face a side surface of the diffusion plate 131, thereby preventing the diffusion plate 131 from moving due to external impacts.

Figure 10:
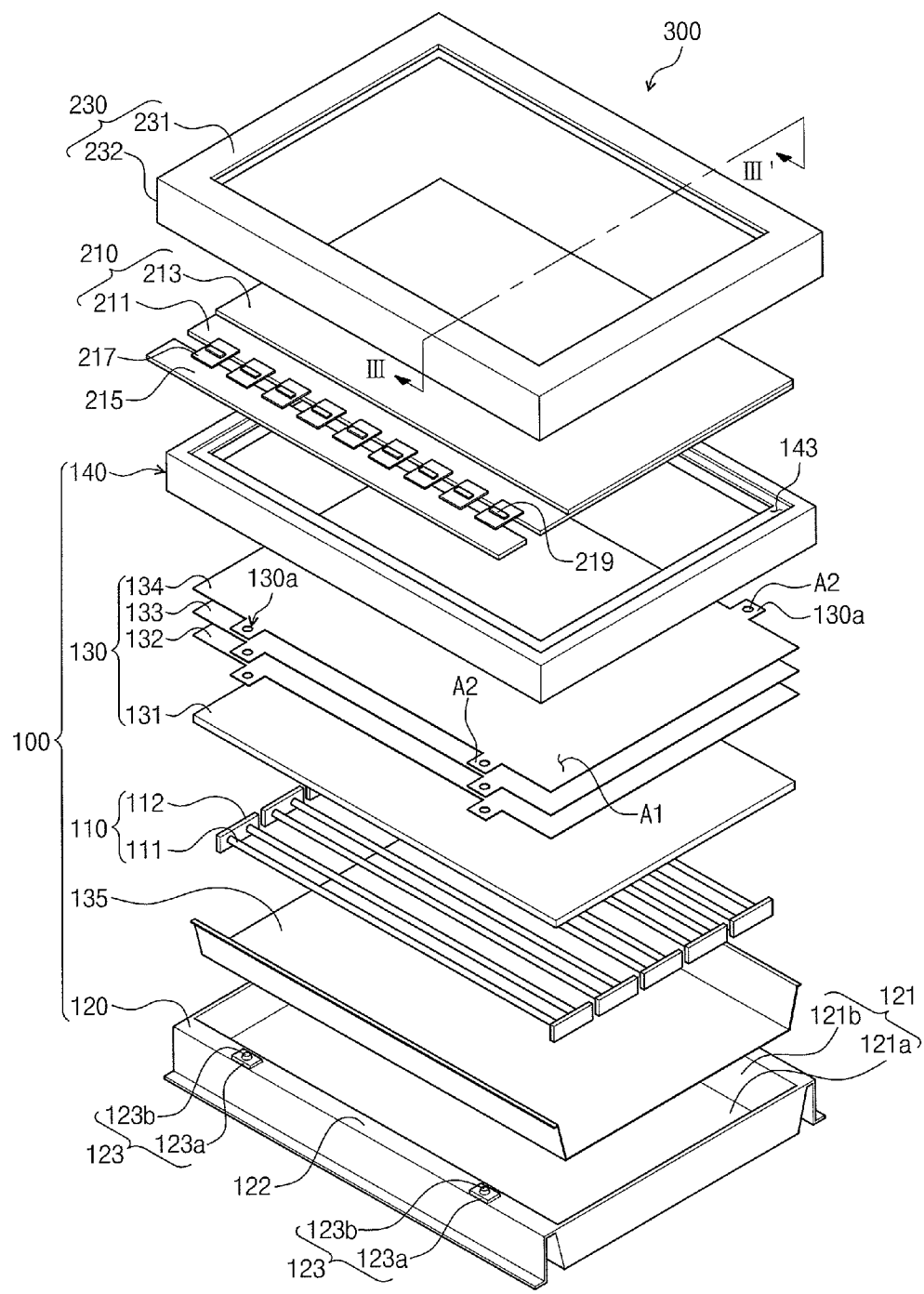
FIG. 10 is an exploded perspective view showing a liquid crystal display according to an exemplary embodiment of the present invention.
Figure 11:
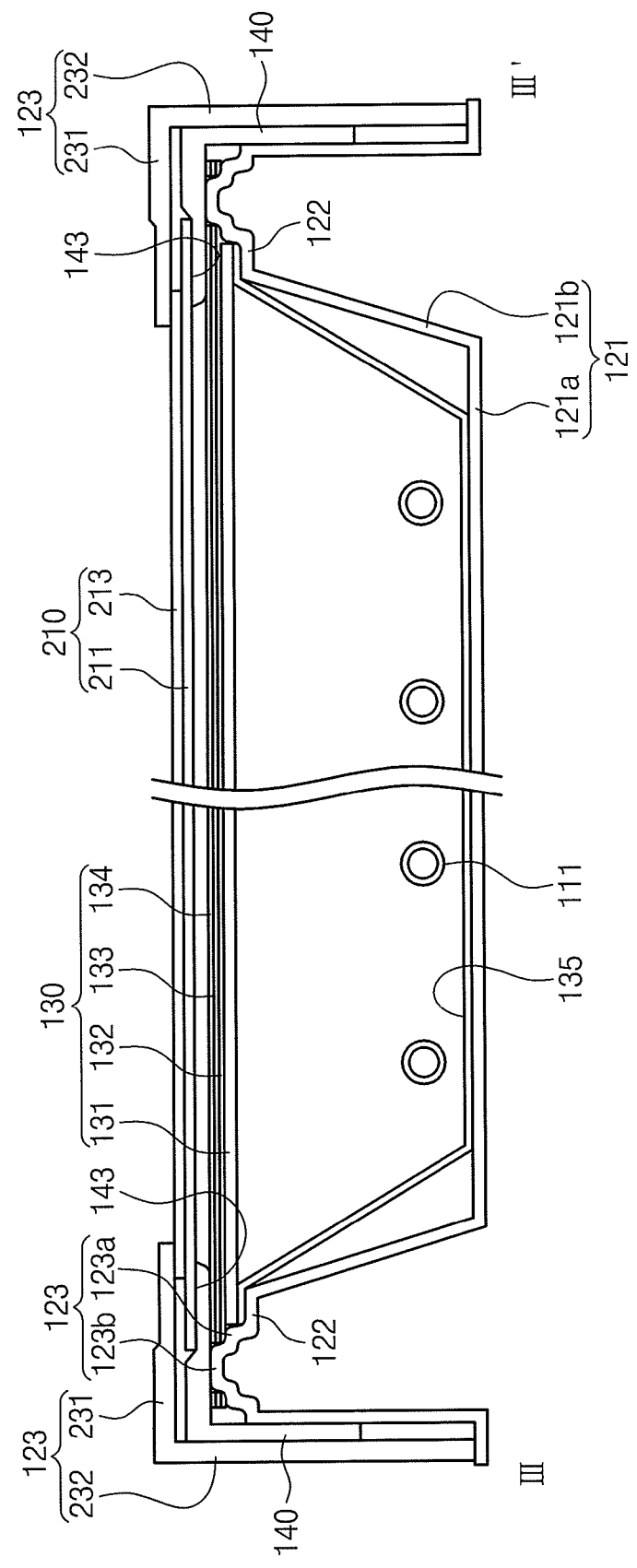
FIG. 11 is a cross-sectional view taken along a line III-III' of FIG. 10.

FIG. 10 is an exploded perspective view showing a liquid crystal display according to an exemplary embodiment of the present invention, and FIG. 11 is a cross-sectional view taken along a line III-III' of FIG. 10.

Referring to FIGS. 10 and 11, a liquid crystal display 300 includes a backlight assembly 100 that generates the light and a liquid crystal display panel 210 that receives the light to display an image.

The backlight assembly 100 may have the same configurations as those of the backlight assemblies shown in FIGS. 1 to 8, and thus repetitive descriptions thereof will be omitted.

The liquid crystal display panel 210 includes an array substrate 211, an opposite substrate 213 coupled with the array substrate 211 to face the array substrate 211, and a liquid crystal layer (not shown) disposed between the array substrate 211 and the opposite substrate 213.

The array substrate 211 may be a thin film transistor (TFT) substrate on which thin film transistors are arranged in a matrix configuration. Each of the TFTs includes a gate electrode connected to a gate line, a source electrode connected to a data line, and a drain electrode connected to a pixel electrode including a transparent conductive material.

The opposite substrate 213 may include RGB color filters, a black matrix, and a common electrode of a transparent conductive material.

The liquid crystal display 300 includes a printed circuit board 215 to apply a gate driving signal and a data driving signal to the liquid crystal display panel 210 and a driving circuit film 217 to connect the printed circuit board 215 with the liquid crystal display panel 210.

The driving circuit film 217 may be a tape carrier package (TCP) on which a driving chip 219 is mounted or a chip on film (COF).

The driving chip 219 may include a data driver that applies a data signal to the liquid crystal display panel 210 in response to the data driving signal. In addition, a gate driver (not shown) that applies a gate signal to the liquid crystal display panel 210 in response to the gate driving signal may be built in the liquid crystal display panel 210 through a thin film process.

The backlight assembly 100 includes the frame member 140 disposed between the optical member 130 and the liquid crystal display panel 210. The frame member 140 is coupled with the receiving member 120 to fix the optical member 130 to the receiving member 120, thereby preventing the movement of the diffusion plate 131 by using the fixing part 141.

The frame member 140 supports the liquid crystal display panel 210. Particularly, the frame member 140 further includes a panel guide portion 143, on which the liquid crystal display panel 210 is mounted. The guide portion 143 includes a recessed surface formed around the perimeter of the frame member 140 on which the liquid crystal display panel 210 rests.

The liquid crystal display 300 is coupled with the frame member 140 and further includes a top chassis 230 to fix the liquid crystal display panel 210 on the frame member 140. The top chassis 230 covers an end portion of the liquid crystal display panel 210 and fixes the liquid crystal display panel 210 to the panel guide portion 143 of the frame member 140. Thus, the top chassis 230 may prevent the liquid crystal display panel 210 from being damaged due to external impacts and the liquid crystal display panel 210 from being separated from the panel guide portion 143 of the frame member 140.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
   a light generating unit;
   a receiving member comprising a receiving part receiving the light generating unit, a supporting part extending from the receiving part, and a protrusion portion protruded from the supporting part;
   an optical member located at a predetermined position on the supporting part and including a portion coupled to the protrusion portion; and
   a frame member including a fixing part and a recess spaced apart from the fixing part, wherein the fixing part and recess protrude downward from a surface of the top of the frame member, the fixing part includes a first barrier wall, a second barrier wall and a third barrier wall that extend from opposite ends of the first barrier wall in a direction perpendicular to the first barrier wall to form a cavity therebetween, the fixing part faces the supporting part and is coupled with the supporting part,
   wherein the fixing part is configured to prevent the optical member from moving in a direction substantially parallel to an upper surface of the supporting part, and wherein the recess is configured to receive the protrusion portion therein.

2. The backlight assembly of claim 1, wherein the light generating unit comprises a plurality of lamps extended in a first direction, arranged in a second direction substantially perpendicular to the first direction, and disposed between the optical member and the receiving member.

3. The backlight assembly of claim 1, wherein the light generating unit comprises:
   a circuit board received in the receiving part and positioned to face the optical member; and
   a plurality of light emitting diodes mounted on the circuit board.

4. The backlight assembly of claim 1, wherein the optical member comprises:
   a diffusion plate; and
   an optical sheet disposed on the diffusion plate.

5. The backlight assembly of claim 4, wherein the protrusion portion includes a multi-tiered protruding structure.

6. The backlight assembly of claim 5, wherein the protrusion portion comprises
   a guide portion protruded from the supporting part to position the diffusion plate on the supporting portion and
   a coupling protrusion protruded from an upper surface of the guide portion and coupled with the optical sheet.

7. The backlight assembly of claim 6, wherein the optical sheet comprises:
   light transmitting portion corresponding to the diffusion plate; and
   a sheet fixing portion extended from the light transmitting portion and disposed on the upper surface of the guide portion, the sheet fixing portion including a fixing hole formed therethrough.

8. The backlight assembly of claim 6, wherein the first barrier wall is positioned along a same line as a side surface of the guide portion neighboring the diffusion plate.

9. The backlight assembly of claim 8, wherein the first barrier wall faces a side surface of the diffusion plate.

10. A display apparatus comprising:
    a backlight assembly; and
    a display panel, wherein the backlight assembly comprises:
    a light generating unit;
    a receiving member comprising a receiving part receiving the light generating unit, a supporting part extending from the receiving part, and a protrusion portion protruded from the supporting part;
    an optical member located at a predetermined position on the supporting part and including a portion coupled to the protrusion portion; and
    a frame member including a fixing part and a recess spaced apart from the fixing part, wherein the fixing part and recess protrude downward from a surface of the top of the frame member, the fixing part includes a first barrier wall, a second barrier wall and a third barrier wall that extend from opposite ends of the first barrier wall in a direction perpendicular to the first barrier wall to form a cavity therebetween, the fixing part faces the supporting part and is coupled with the supporting part, wherein the fixing part is configured to prevent the optical member from moving in a direction substantially parallel to an upper surface of the supporting part, and wherein the recess is configured to receive the protrusion portion therein.

11. The display apparatus of claim 10, wherein the light generating unit comprises a plurality of lamps extended in a first direction, arranged in a second direction substantially perpendicular to the first direction, and disposed between the optical member and the receiving member.

12. The display apparatus of claim 10, wherein the frame member comprises a panel guide portion on which the display panel is disposed.

13. The display apparatus of claim 12, further comprising a top chassis coupled with the frame member to fix the display panel on the frame member.

14. The display apparatus of claim 10, wherein the optical member comprises:
 a diffusion plate; and
 an optical sheet disposed on the diffusion plate.

15. The display apparatus of claim 14, wherein the protrusion portion includes a multi-tiered protruding structure.

16. The display apparatus of claim 15, wherein the protrusion portion comprises
 a guide portion protruded from the supporting part to position the diffusion plate on the supporting portion and
 a coupling protrusion protruded from an upper surface of the guide portion and coupled with the optical sheet.

17. The display apparatus of claim 16, wherein the first barrier wall is positioned along the same line as a side surface of the guide portion neighboring the diffusion plate and faces a side surface of the diffusion plate.

18. The display apparatus of claim 16, wherein the optical sheet comprises:
 a light transmitting portion corresponding to the diffusion plate; and
 a sheet fixing portion extended from the light transmitting portion and disposed on the upper surface of the guide portion, the sheet fixing portion including a fixing hole formed therethrough.

* * * * *